Feb. 3, 1953 R. D. KELL 2,627,549

BAND WIDTH REDUCING SYSTEM AND METHOD

Filed Aug. 18, 1950

INVENTOR
Ray D. Kell
BY
[signature]
ATTORNEY

Patented Feb. 3, 1953 2,627,549

UNITED STATES PATENT OFFICE 2,627,549

BAND WIDTH REDUCING SYSTEM AND METHOD

Ray D. Kell, Princeton, N. J., assignor to Radio Corporation of America, a corporation of Delaware Application August 18, 1950, Serial No. 180,148

6 Claims. (Cl. 178—5.4)

The present invention relates to signal processing circuits and methods for treating electrical signals of predetermined band width so as to render them capable of satisfactory transmission over communication circuits having substantially less band width.

In more particularly, although not necessarily exclusively, the present invention relates to an improved apparatus and method for transducing time division multiplex signals having a predetermined sampling rate into multiplex signals having a lower effective sampling rate. As applied more particularly to time division multiplex color television systems the present invention is involved with systems and methods for transducing a high sampling rate color television signal into color television signals suitable for transmission over communication channels having an upper cut-off frequency substantially lower than the high frequency sampling rate.

In the communication art it is often desirable to transmit signal intelligence over communication channels having restricted band width. Depending upon the type of signal being transmitted the degree to which the restricted band width of the communication channel adversely affects the information communicated varies considerably.

Purely by way of example, consideration may be given to present day color television systems of the time division multiplex variety and more particularly of the dot multiplex variety. Such systems are fully described in an article appearing on page 66 in the December 1949 issue of "Electronics." One of the more popular forms of the dot multiplex color television system comprises an arrangement whereby to all intents and purposes the high frequency picture detail of all the transmitter color channels is simultaneously transmitted without undergoing time multiplexing treatment. In such case only the low frequency components of the individual color channels are multiplexed. The resultant signal although containing bypassed and unmultiplexed high frequency elements and multiplexed low frequency elements may be considered as including two other type information components. The first of these components is representative of black and white brightness variations of the color scene and fall within a band of frequencies from zero up to approximately the upper limit of the television channel. The second component may be thought of as representing color hue and saturation information and is found in the form of an amplitude modulated carrier having upper and lower sidebands, the frequency of the carrier corresponding to the sampling rate of the time division multiplexing system. The technique of developing such a signal may be varied, but the functional composition of the dot multiplex color television signal of the type described in the above referenced article may be thus considered.

Correspondingly, should the composite dot multiplex color television signal be transmitted over a signal channel which does not pass the carrier frequency of the color component (sampling rate) no color information can be communicated. It is present practice to utilize a sampling rate which falls between 3½ and 4 mc. Thus the color hue and saturation information will be centered about a carrier falling between 3½ to 4 mc. This rather high frequency sampling rate has made it difficult to communicate color television signals of the dot multiplex variety from one point to another on a standard television network since such network facilities usually provide transmission up to and not greatly in excess of 3 mc. Thus only the brightness component of the color television signal will be communicated by the network and color information will be lost. Such a color signal having lost its sampling carrier would be of use only to standard black and white receivers to reproduce a black and white version of the color signal, but would be of no value in producing a color television picture by means of appropriate dot multiplex color television receivers.

It is therefore an object of the present invention to provide an improved signal processing method and apparatus which will permit satisfactory transmission of wide band signal intelligence over small band width signal channels.

It is another object of the present invention to provide an improved signal processing method and apparatus for transducing dot multiplex color television signals based upon a rather high color channel sampling rate into a dot multiplex type color signal appearing to have a lower sampling rate such that color information may be communicated over rather small band width signal channels.

It is another object of the present invention to provide suitable signal processing methods and apparatus for transducing the lower sampling rate multiplex color signal thus produced into a higher sampling rate multiplex for use by standard color receivers.

In the realization of the above objects and features of advantage, the present invention contemplates the following treatment of the components comprising the common dot multiplex color television signal. First, the brightness component is reduced in band width so that its upper frequency is less than the cut-off frequency of the channel over which the color information is to be sent. Second, the band width of at least the lower side band of the sampling rate carrier is reduced. Third, the resulting sampling rate carrier with adjacent side bands is heterodyned by a shifting frequency which effectively shifts the sampling rate carrier from a frequency above the cut-off frequency of the channel to be used, to one which is below this cut-off frequency. This technique then allows the composite dot multiplex color signal to be transmitted over the small band width communication facility without entirely losing color information.

Other objects and features of advantage set forth hereinabove as well as a more complete understanding of the nature of the present invention will become apparent through a reading of the following description, especially when taken in connection with the accompanying drawings in which.

Figure 1:
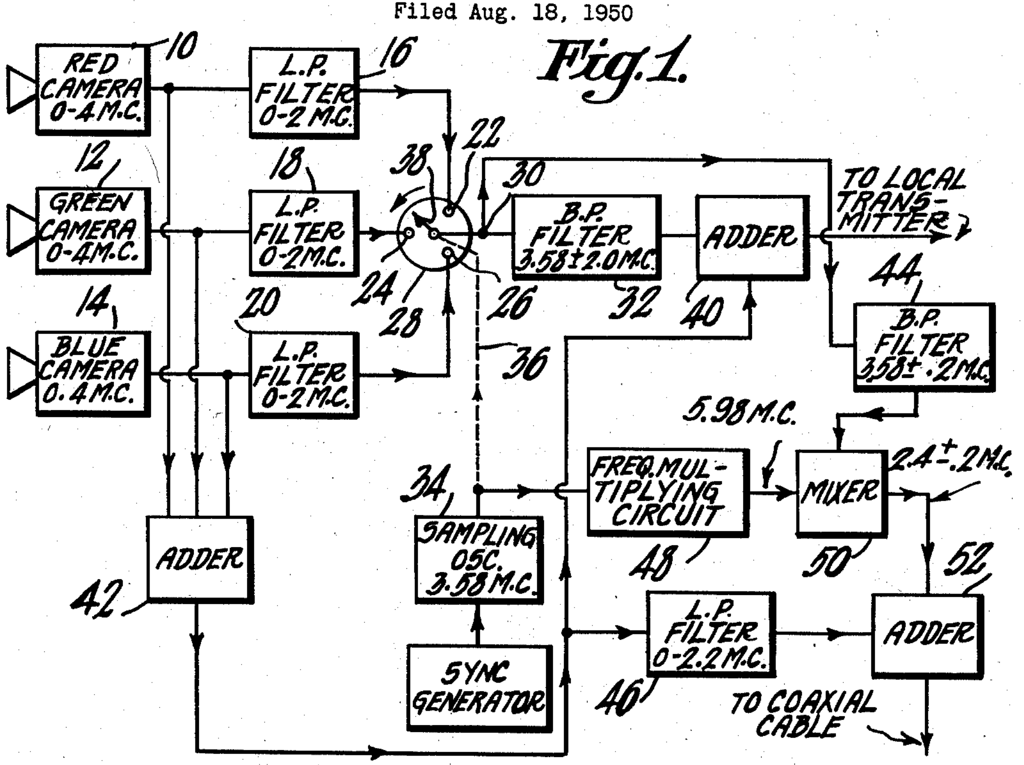
Figure 1 is a block diagram representation of one form of the present invention as applied to the transmitter of dot multiplex color television system.

Turning now to Figure 1, there is represented by blocks 10, 12 and 14 three television cameras respectively, productive of signals representing red, green and blue components of the scene being televised. Such cameras may be ordinary black and white type television cameras with suitable red, green and blue filters placed in front of them. For the purposes of the present invention the three separate cameras may be replaced by a single camera having a red, green and blue output terminal Regardless of how a color information is produced red, green and blue color signals are passed through respective low pass filters 16, 18 and 20 before being applied to the input terminals 22, 24 and 26 of the multiplex sampler 28. The use of the low pass filters prevent signal information in excess of 2 mc. from reaching the sampler 28.

The output of the sampler 28, appearing at the terminal 30 is applied to a band pass circuit 32 having a band width of for example 4 mc. The 4 mc. band pass of the circuit 38 is centered about the exemplified 3.58 rate at which the sampler 28 is operated. A 3.58 mc. operation is diagrammatically indicated by the sampling oscillator 34 and by means of the dotted line connection 36 between the sampling oscillator to the rotating armature 38. It is to be understood for purposes of convenience that the commutator 38 has been diagrammatically indicated as a mechanical commutating device. It is in practice sometimes to use an electronic type sampling circuit such, for example, shown and described in U. S. Pat. to A. H. Dickinson 2,447,799, August 24, 1948.

The output of the band pass circuit 32 is then applied to an adder circuit 40 which combines the sampling carrier 3.58 mc. (plus its attendant side bands) with a brightness variation signal derived from the adder 42. The adder 42 merely combines the output of the red, green and blue camera into a signal which simultaneously represents all colors in the scene and hence may be thought of as a black and white or panchromatic signal. The resulting signal appearing at the output may then be applied to a local transmitter for modulation thereof.

The system thus far described does not form a part of the present invention but is merely exemplary of the way in which a composite time division dot multiplex color television signal may be conveniently produced. Other schemes may, of course, be employed if desired as for example, shown and described in the above reference Electronics article.

It will be seen however that should it be desirable to transmit the dot multiplex signal over circuits such as for example, a coaxial cable having a cut-off frequency below 3.58 mc., no color information could be communicated to a distant location. This is because, as pointed out above, the color information portion of the dot multiplex signal is in essence communicated by the 3.58 mc. carrier with its associated side bands. Elimination of the carrier will then prevent accurate color information from being reproduced.

According to the present invention the side bands of the 3.58 mc. color information carrier are reduced by passing the output of the sampler 28 through a restricted band pass circuit 44. This circuit is provided with a band pass of only .2 mc. It is found in practice that .2 mc. side band information is sufficient to provide acceptable color detail in dot multiplex television signals. Next the brightness component appearing at the output of the adder 40 is restricted in band width by passing it through the low pass circuit 46 which has an upper cut off frequency of, for example, 2.2 mc. Now in further accordance with the present invention the 3.58 carrier color information is in effect shifted to a lower frequency such as for example, 2.4 mc. which it is assumed the coaxial cable or network over which the color signal is to be transmitted is capable of passing. This shift is accomplished by heterodyning the output of the band pass circuit 44 with a higher frequency signal such as for example, 5.98 mc. The 5.98 mc. source of signal is indicated by way of example, at 48 as being a frequency multiplying circuit acting upon the output of the sampling oscillator 34. The heterodyning takes place in the mixer 50 so that the difference signal between the shifting signal 5.98 mc. and 3.58 mc. carrier color information will appear at the output of the mixer 50.

Since now in accordance with the present invention the color information carrier or effective sampling rate of the dot multiplexing signal has been transformed to 2.4 mc. (5.98–3.58 mc.) and the side bands of the sampling rate carrier only occupy .4 mc. (plus or minus .2 mc.) the output of the mixer 50 may be combined with the output of the low pass filter 46 by means of the adder 52. The output of the adder 52 will then contain a brightness component of 0 to 2.2 mc. and a color information component defining color hue and saturation which is centered upon a carrier of 2.4 mc. having an upper and lower side band of .2 mc. each. This of course may be adequately handled by the network facilities having assumed cut off of around 3 mc.

The reduced band width signal upon arriving at a remote location is not directly useable by dot multiplex color television receiving equipment utilizing a higher sampling rate than 2.4 mc. For example, if the reduced band width color television signal, as provided by the present invention, is communicated by network facilities to a television transmitting station for rebroadcast and the color television receivers which the transmitting station serves are based upon a 3.58 mc. sampling rate some further signal processing is required.

Figure 2:
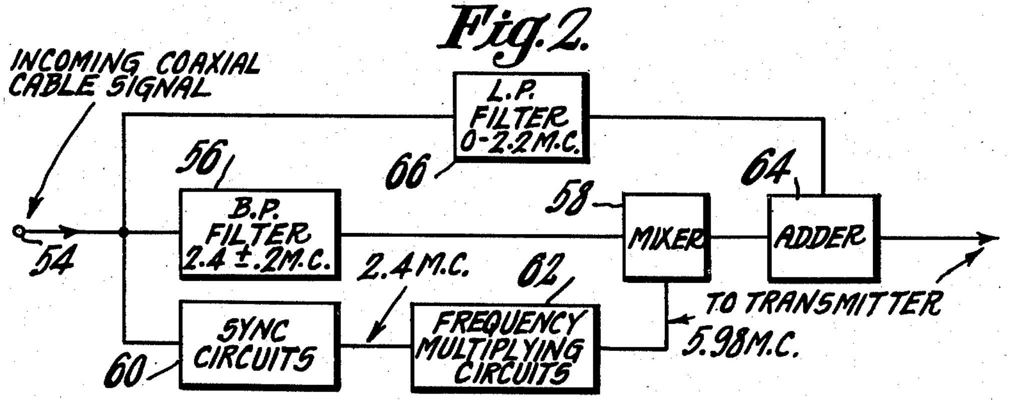
Figure 2 is a block diagram representation of the present invention as applied to a signal transducing arrangement for reconverting the reduced band width signal to a form suitable for use by standard dot multiplex color receivers.

According to the present invention as shown in Figure 2 the reduced band width dot multiplex color television signal as received over the coaxial cable and having a 2.4 mc. sampling rate may be processed to provide a higher effective sampling rate by the arrangement shown in Figure 2. The incoming signal from the coaxial cable is applied to terminal 54 which is connected to the input of band pass filter 56. The band pass filter 56 passes the 2.4 mc. carrier with its adjacent .2 mc. side bands to the mixer circuit 58. A synchronizing circuit 60 is also provided for producing a 2.4 mc. signal which is in synchronism with a 2.4 mc. carrier of the incoming signal. The synchronizing circuit 60 may be of various designs and for example may be responsive to a 2.4 mc. burst component appearing on the back porch of the incoming horizontal synchronizing and blanking pulses. The 2.4 mc. signal is then applied to a frequency multiplying circuit such as 62 which multiplies the 2.4 signal to some convenient value such as 5.98 mc. A 5.98 mc. signal when non-linearly mixed by the mixer 58 with the output of the band pass filter 56 will produce a difference carrier of 3.58 mc. having adjacent side bands of .2 mc. each. The resulting beat signal is applied to the adder 64 for combination with the output of low pass filter 66. Low pass filter 66 communicates only the brightness variations of the incoming signal. By way of example, and based upon the particular embodiment shown in Figure 1, the brightness component of the incoming signal falls between 0 and approximately 2.2 mc. Thus the signal appearing at the adder 64 will be suitable for modulation of a conventional television transmitter so as to be usefully received by dot multiplex color television receivers based upon a 3.58 mc. sampling rate.

Figure 3:
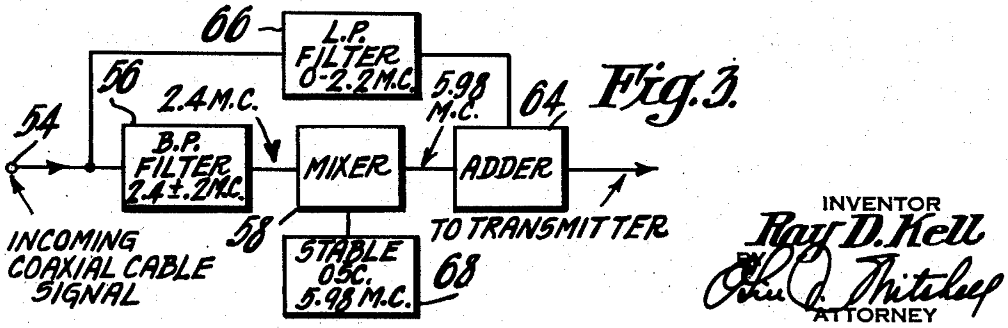
Figure 3 is a block diagram representation of a modification of the form of the present inven tion depicted in Figure 2.

The arrangement in Figure 3 is substantially identical to that as shown in Figure 2 with the exception that the 5.98 mc. signal used for shifting the 2.4 mc. color information carrier is derived from a stable oscillator source such as 68. If the 5.98 mc. oscillator 68 in Figure 3 is made sufficiently stable and accurate in frequency, the sync circuits such as 60 of Figure 2 need not be employed. This, of course, will mean that the effective sampling rate of the color signal applied to the transmitter in Figure 3 may vary somewhat from 3.58 mc. by small amounts. It is apparent of course that any deviation of the oscillator 68 from 5.98 mc. will produce an error in the interlacing action of dot multiplex receivers designed to operate at 3.58 mc. Experience has shown however that such interlacing error as may obtain from reasonably stable oscillators such as for example the crystal variety is fully tolerable. Correspondingly, a crystal oscillator or other stable source of signal frequency may be substituted for the frequency multiplying circuit 48 of Figure 1.

In the above description of the present invention certain numerical values of frequency have been assumed for purposes of explanation. It is of course apparent that the exact values of frequencies used in the above description are not critical to the successful practice of the principles involved by the present invention. Other sampling rates than those described herein may be used depending upon the particular standards governing any particular color television transmission. Correspondingly, the amount that the color information carrier has to be shifted and lowered to fall satisfactorily within the range of reduced band width network facilities is dependent upon individual situations and equipments.

Having thus described my invention what is claimed is:

1. In an electrical signalling system employing a composite communication signal having a band of intelligence signals and a carrier having a frequency outside the band, the carrier being modulated by other intelligence signals lower in frequency than said carrier and related to the intelligence represented by signals in the band, the combination comprising low pass filter means adapted to pass only the lower frequency portions of said band of intelligence signals, means for applying at least the intelligence signal portion of said communication signal to the input of said low pass filter, means adapted to heterodyne the carrier to a value closer to, but still outside the range of said low pass filter means, and means for linearly combining the output of said low pass filter means and said heterodyning means.

2. In an electrical signalling system employing signal frequency $f_0$, $f_1$, $f_2$, $f_3$ and $f_4$, each successive frequency value being higher than the one preceding, this system being adapted to handle a band of intelligence signals ranging from $f_0$ to $f_1$ as well as a modulated carrier of frequency $f_3$ having a lower limit of its lower sideband at $f_2$ while having its upper limit of its upper sideband at $f_4$, the combination of low pass filter means having its upper cut off frequency at a value $f_1'$, which is lower than $f_1$, band pass filter means having band pass of a width substantially less than the value $f_4-f_2$, means for applying said carrier and sidebands to the input of said band pass means and heterodyning means adapted to heterodyne the carrier frequency $f_3$ to a lower value $f_3'$ by an amount such that the difference between the lower limit of the restricted carrier of the lower sideband and $f_1'$ is no greater than $f_2-f_1$, the value of $f_3'$ being higher than the value of $f_1'$.

3. In a color television system adapted to represent a color television image by two sets of signals, the first set of signals depicting brightness variations of the television scene and falling in the band $f_1$ to $f_2$, the second set of signals depicting color hue and saturation information of points within the scene, the second set of signals being presented by a modulated carrier of frequency $f_3$ where $f_1$, $f_2$, and $f_3$ represent successively higher values of signal frequency, the combination of low pass filter means having an upper cut off frequency $f_2'$ substantially lower than the value $f_2$, means for applying said first set of signals to said low pass filter means and heterodyning means for heterodyning the carrier $f_3$ to a lower value $f_3'$ such that $f_3-f_2$ is no less than $f_3'-f_2'$, the value of $f_3'$ being higher than the value of $f_2'$.

4. In a time division multiplex color television transmission system incorporating a plurality of color channels with means for sampling said channels at a predetermined sampling frequency to produce a primary color indicating signal, said system also incorporating means for producing a brightness indicating signal which simultaneously represents all color channels, the combination of means for generating a shifting signal having a frequency greater than but in fixed timing relation to the sampling frequency of the multiplex system, means for reducing the bandwidth of said color indicating signal to produce an intermediate color indicating signal, means for reducing the bandwidth of said brightness indicating signal to produce a secondary brightness indicating signal, means for heterodyning said intermediate color indicating signal with said shifting signal to produce a secondary color indicating signal whose center frequency lies outside the bandwidth of said secondary brightness indicating signal, and means for combining said secondary color indicating signal with said secondary brightness indicating signal.

5. A signal transducing system for a time division multiplex color television signal, of the type having a color component and a brightness component, each embracing a different range of frequencies, the color component representing the multiplex sampling at a predetermined sampling rate of a plurality of color channels while the brightness component represents simultaneous brightness variations of all color channels, the transducing system comprising in combination a first filter circuit adapted to pass substantially only said color component and discriminate against said brightness component, means for applying received color television signal to said filter circuit, a source of shifting signal of a frequency higher than but bearing a relatively constant timing relation to the sampling rate upon which said color component is based, non linear combining means connected for combining said shifting signal with the output of said first filter circuit, a second filter circuit adapted to pass substantially only said brightness component and discriminate against said color component, means for applying received color television signal to said second filter circuit, and means for linearly combining the output of said second filter circuit with the output of said non linear combining means.

6. Apparatus according to claim 5 wherein said color television signal includes a synchronizing component representative of the exact sampling rate upon which the color component is based, and wherein said source of shifting signal includes synchronizing means for timing said shifting signal in accordance with said received synchronizing component.

RAY D. KELL.

REFERENCES CITED

The following references are of record in the file of this patent:

UNITED STATES PATENTS

| Number | Name | Date |
|---|---|---|
| 1,595,135 | Affel | Aug. 10, 1926 |
| 1,769,920 | Gray | July 8, 1930 |
| 1,911,850 | Sandeman et al. | May 30, 1933 |
| 2,035,545 | Green | Mar. 31, 1936 |
| 2,095,360 | Green | Oct. 12, 1937 |
| 2,255,642 | Artzt | Sept. 9, 1941 |